United States Patent [19]

Gancy

[11] 4,429,065

[45] Jan. 31, 1984

[54] CONTROLLED DENSITY HYDRAULIC FLUIDS

[76] Inventor: Alan B. Gancy, 265 Robineau Rd., Syracuse, N.Y. 13207

[21] Appl. No.: 291,243

[22] Filed: Aug. 10, 1981

[51] Int. Cl.$^3$ .............................................. C08J 3/02
[52] U.S. Cl. .................... 523/223; 210/693; 524/474; 585/12
[58] Field of Search ............... 524/474, 484, 485, 486, 524/490, 491; 523/221, 223, 173; 585/10, 12

[56] References Cited

U.S. PATENT DOCUMENTS

| | | | |
|---|---|---|---|
| 3,432,431 | 3/1969 | Mitacek | 585/10 |
| 3,639,644 | 2/1972 | Morway | 585/10 |
| 3,692,676 | 9/1972 | Culter | 585/10 |
| 3,847,851 | 11/1974 | Tugukuni | 523/221 |
| 3,933,657 | 1/1976 | Seni | 585/10 |
| 3,960,791 | 6/1976 | Kondo | 524/485 |
| 4,028,324 | 6/1977 | Tuschner | 524/474 |
| 4,294,712 | 10/1981 | Ueno | 585/10 |
| 4,356,342 | 10/1982 | Verne | 524/474 |

*Primary Examiner*—Paul R. Michl
*Attorney, Agent, or Firm*—Austin R. Miller

[57] ABSTRACT

A variable density fluid is provided comprising a multiplicity of polymer micro-particles or polymer microfilaments added to a suspending liquid. By varying the density, shape, size, and material of construction of the added micro-particles or microfilaments, the physical properties of the composite liquid suspension, such as density, viscosity and compressibility, are controllable. In one specific embodiment, the polymer micro-particles can be used to selectively remove a liquid from a mixture of liquids, such as oil from sea water for example.

28 Claims, 8 Drawing Figures

U.S. Patent  Jan. 31, 1984  Sheet 1 of 3  4,429,065
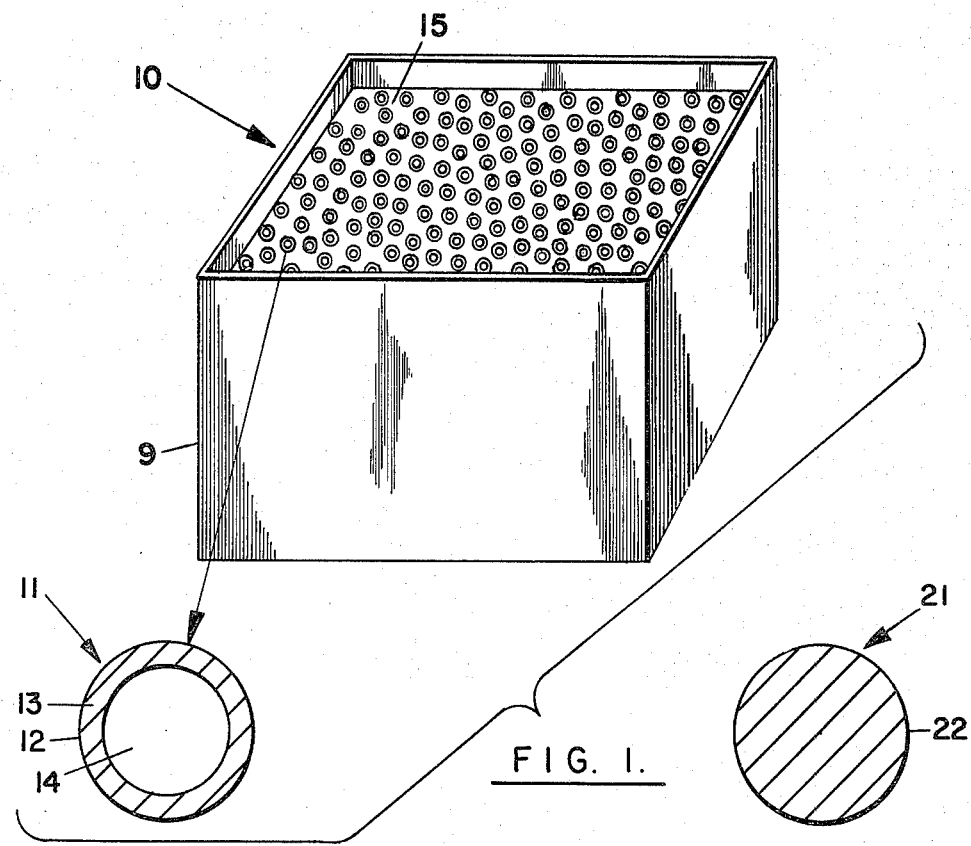
FIG. 1.
FIG. 1A.
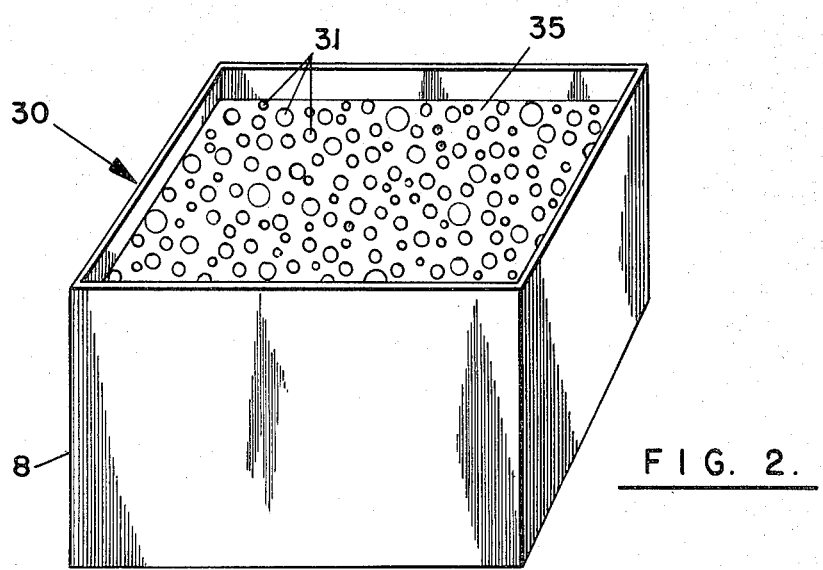
FIG. 2.

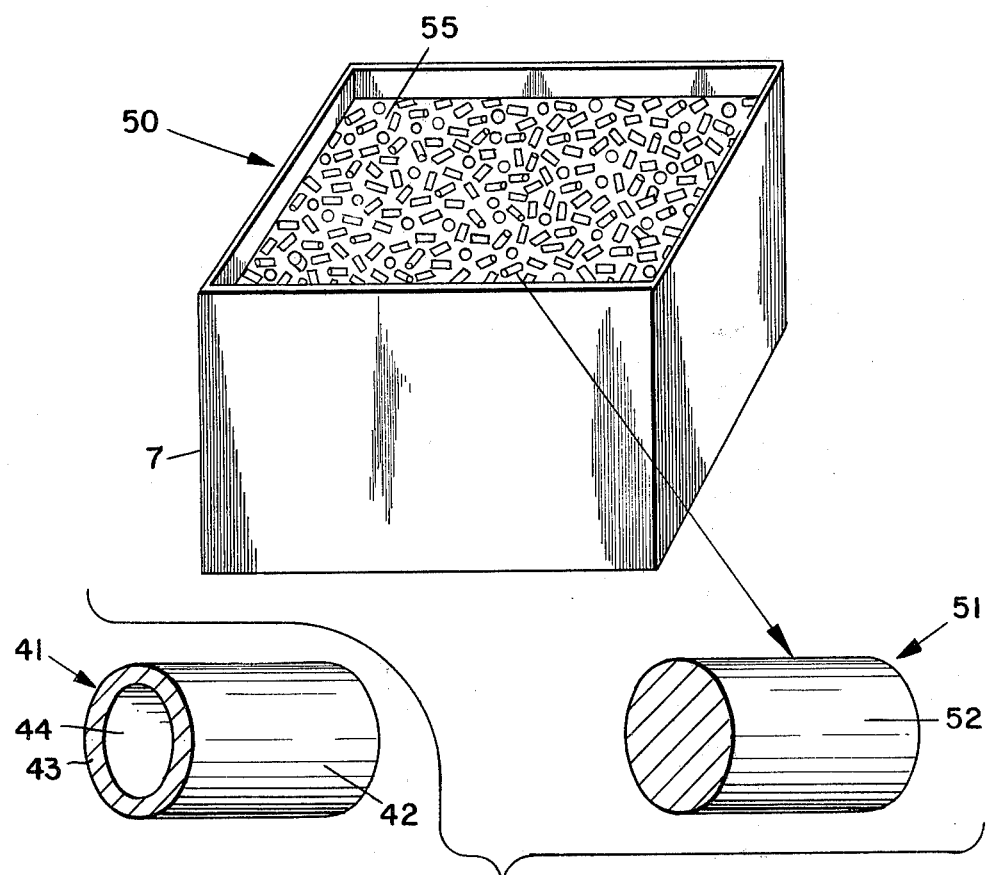
FIG. 3A.
FIG. 3.
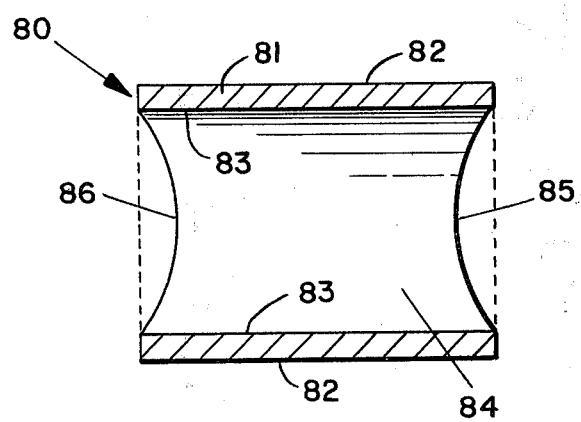
FIG. 4.

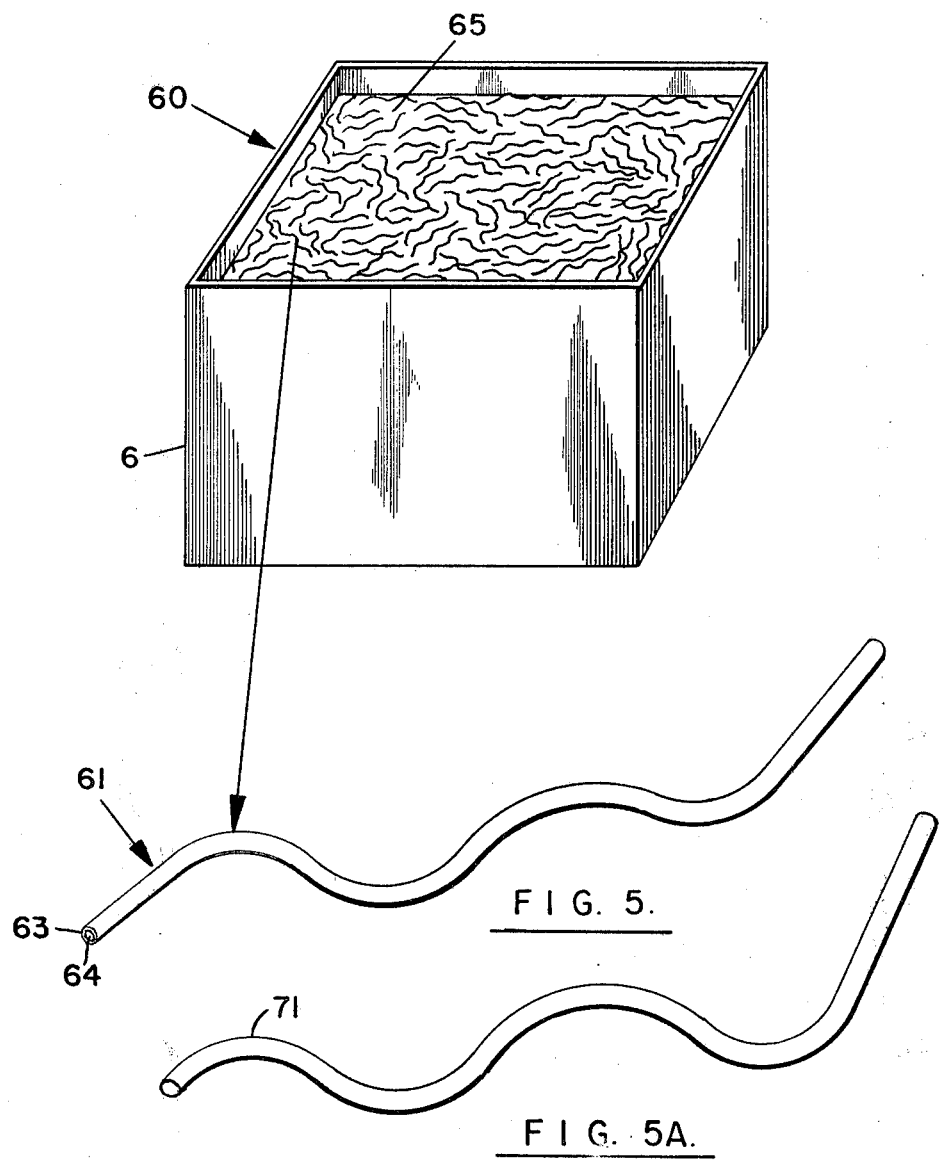

CONTROLLED DENSITY HYDRAULIC FLUIDS

BACKGROUND OF THE INVENTION

1. Field of the Invention

The present invention relates to a variable density fluid, and more specifically, relates to such a fluid comprising a multiplicity of polymer micro-particles suspended in a fluid. The invention further relates to a variable viscosity fluid, and more specifically relates to such a fluid comprising a multiplicity of polymer microfilaments suspended in a fluid. The present invention further relates to a variable compressibility fluid.

The present invention also relates to an inexpensive, non-toxic fluid which can be pumped and valved similarly to water but having a much lower bulk density. Such a low density fluid reduces the pressure and weight requirements of containing vessels, conduits and pumps.

In one embodiment of the present invention, the microparticles are modified to remove liquid hydrocarbon contaminants from another liquid, such as water. This embodiment is particularly useful in the clean-up of oil spills on ocean water.

2. Description of the Prior Art

Polymer micro-particles have found wide acceptance for many purposes, but in particular have been used in both the latex coating and oil spill clean-up fields. U.S. Pat. No. 3,755,238, granted to Wiita on Aug. 28, 1978, discloses a latex coating composition having dispersed therein finely divided polyolefin particles having a particle size from 8 to 30 microns. Wiita discloses that the addition of polyolefin particles substantially reduces blocking while maintaining good gloss characteristics in the vinyl resin latex coatings. Similarly, U.S. Pat. No. 3,941,736, granted to Aldrich on Mar. 2, 1976, discloses an aqueous dispersion of hydrocarbon resin in finely divided form to be used in applications such as sizing paper.

In the hydrocarbon contaminant removal field, U.S. Pat. No. 4,230,566, granted to Faudree on Oct. 28, 1980, discloses a method of producing a granular polyurethane cellular foam for absorbing water-borne, water insoluble hydrocarbons. Faudree teaches the production of a low density cellular polymer through the steps of pre-heating a polyisocyanate with a linear monohydric alcohol to form a prepolymer having a greater surface affinity for oils or similar contaminant hydrocarbons; combining the prepolymer with a polyol in the presence of a blowing agent and reacting said mixture in a mold to effect exothermic cellular polymeric formation; and grinding the cellular polymeric formation to a granular size. Faudree further teaches that the grinding step causes the cells in the closed cell foam to rupture. These ruptured cells tend to hold the oil within their open cavities and thus promote their own buoyancy. The pre-reaction of the organic polyisocyanate linear monohydric alcohol creates a prepolymer whose outer surface has a high affinity for oils and is thus hydrophobic.

U.S. Pat. No. 3,657,125, granted to Strickman on Apr. 18, 1972, discloses a method of removing oil from a mixture of oil and water comprising contacting the oil with polyurethane collector granules having jagged, spiney, cragged forms devoid of cellular structure and having a particle size between 50 and 750 microns.

Thus, there has been a need in the liquid hydrocarbon contamination removal art for an effective and easily manufactured means for selectively removing liquid hydrocarbon contaminants from other liquids, such as oil slicks from ocean water for example.

Furthermore, there has been a need in the fluid arts for a fluid whose density may be varied as desired. More specifically, there has been a need in the art for an inexpensive, non-toxic fluid having properties similar to water but having a much lower bulk density.

There has been a further need for a low density fluid having a specific heat and thermal conductivity similar to that of the suspending fluid, such as water for example.

There has been a still further need in the fluid arts for a fluid having a controllable compressibility.

There has been a still further need in the fluid arts for a fluid whose viscosity may be controlled and varied as desired.

OBJECTS OF THE INVENTION

It is an important object of the present invention to provide a means for varying the density of liquids. A more specific important object of the present invention is to provide an inexpensive and non-toxic fluid having properties similar to water but having a lower bulk density.

It is a further important object of the present invention to provide a low density liquid having a specific heat and thermal conductivity similar to that of the suspending liquid, such as water, for example.

Another important object of the present invention is to provide a means for varying the compressibility of liquids.

It is a further important object of the present invention to provide an economical means for removing liquid hydrocarbon contaminants from other liquids, such as oil from sea water for example.

It is a further important object of the present invention to provide a fluid whose viscosity may be controlled and varied as desired.

SUMMARY OF THE INVENTION

A variable density fluid in accordance with the present invention comprises a multiplicity of polymer micro-particles or polymer microfilaments added to a suspending liquid. By varying the shape, size and construction of the added micro-particles or microfilaments, the physical properties of the composite liquid suspension, such as density, viscosity and compressibility, may be varied.

In a specific embodiment of the present invention, the polymer particles are hollow and have an exposed hydrophobic interior surface thereby promoting the selective absorbtion of liquid hydrocarbons in preference to some other liquid, such as water for example. This embodiment is extremely useful in cleaning up contaminating liquids, such as oil spills on ocean water, for example.

BRIEF DESCRIPTION OF THE DRAWINGS

The invention, its organization, construction and operation, will be best understood from the following detailed description taken in conjunction with the accompanying drawings, in which:

FIG. 1 is an isometric view of a vessel containing one embodiment of the present invention, with one particle shown enlarged and in section;

FIG. 1A is an enlarged sectional view of a particle used in conjunction with a high density hydraulic fluid embodiment of the present invention;

FIG. 2 is an isometric view of a vessel containing a suspension comprising a polydispersed embodiment of the present invention;

FIG. 3 is an isometric view of a vessel containing a suspension of cylindrically shaped particles comprising a specific embodiment of the present invention with one particle shown enlarged;

FIG. 3A is an enlarged view of a micro-tubule used in a low density hydraulic fluid embodiment of the present invention;

FIG. 4 is a sectional view of an enlarged micro-tubule used in another specific embodiment of the present invention;

FIG. 5 is an isometric view of a vessel containing a suspension of microfilaments used in a variable viscosity embodiment of the present invention with one microfilament shown enlarged;

FIG. 5A is an enlarged view of a microfilament used in a high density, variable viscosity hydraulic fluid embodiment of the present invention.

Although specific forms of the invention have been selected for illustration in the drawings, and although specific terms will be used in the specification in describing features illustrated therein, these are not intended to define or to limit the scope of the invention, which is defined in the appended claims.

DESCRIPTION OF THE PREFERRED EMBODIMENTS

Referring to FIG. 1, variable low density hydraulic fluid 10 is shown in container 9. Hydraulic fluid 10 comprises a multiplicity of hollow spherically shaped particles 11 suspended in liquid 15. Each hollow particle 11 comprises a wall 13 having a smooth outer surface 12 and enclosing a spherical inner space 14 containing a gas, such as air for example. The hollow particles 11 are typically composed of an organic polymer and have a diameter in the range from about 10 to about 1,000 microns.

The density of hydraulic fluid 10 may be varied by either varying the concentration of particles 11 in fluid 10 or by varying the density of particles 11. The particle density may be varied by changing the particle material, by varying the particle wall thickness or by varying the type of gas contained in interior space 14 of spherical particle 11. This gas, such as air for example, typically has a much lower density than the density of the suspending liquid 15. In addition, the material comprising particle wall 13, such as an organic polymer for example, may also have a lower density than that of suspending liquid 15. Thus, by adding spherical particles 11 to suspending liquid 15, the density of the resultant hydraulic fluid 10 is much lower than that of the pure liquid 15.

The exterior surface 12 of the spheres 11 should be wettable in the suspending fluid, or hydrophilic in the case of water, in order to promote capillary action. The particles 11 are typically composed of polymers, such as polyethylene and polypropylene for example. Thus, surface treatment of the exterior surface 12 may be required to render the organic polymer wettable. In the case when water is used as the suspending fluid, a simple partial oxidation of the surface 12 is generally sufficient to render the exterior surface 12 hydrophilic.

Furthermore, it is critical for purposes of the present invention that exterior surfaces 12 be smooth so that the particles 11 can easily slide over one another. Smooth outer surfaces 12 prevent agglomeration of particles 11 and promote desirable flow properties in the hydraulic fluid 10.

In order to achieve the objectives and advantages of the present invention, the suspending liquid-to-particle volume ratio should be in the range from about 0.6 to about 2.0. Although it may be possible to use a suspending liquid-to-particle volume ratio higher than 2.0, this may lead to undesirable segregation of solids from the suspending liquids, resulting in a non-uniform fluid in many respects.

The suspending liquid 15 may be any of a number of fluids including water, aqueous colloidal fluids, electrolytic solutions such as sea water for example, solutions of salts, solutions of acids, and solutions of bases in water, and solutions of organic liquids in water, among others, and organic liquids.

In another embodiment of the present invention spherically shaped particles are used to provide a high density hydraulic fluid. Referring to FIG. 1A, spherical particle 21 having a smooth and wettable outer surface 22 is shown. Spherical particle 21 is solid and is composed of a material having a density higher than that of the liquid in which it is suspended. Thus, by adding a multiplicity of spherical particles 21 having a density greater than that of the suspending liquid, a hydraulic fluid is obtained having a density greater than that of the suspending liquid, before the addition of solid particles 21.

The particles to be added to the suspending fluid may be all of similar size and shape or may be of differing sizes and shapes. Referring to FIG. 2, a hydraulic fluid 30 composed of a suspending liquid 35 and a multiplicity of differently sized particles 31 is shown in container 8. This polydispersed hydraulic fluid 30 utilizes the same type of particles as were described in the monodispersed (containing particles having similar size and shape) hydraulic fluid 10, namely, either hollow spherical particles resulting in a low density hydraulic fluid or solid spherical particles resulting in a high density hydraulic fluid.

The particles may have shapes other than the above-described spheres in accordance with the present invention. Referring to FIG. 3, a hydraulic fluid 50 comprised of of suspending liquid 55 and a multiplicity of cylindrically shaped particles 51 is shown. As in the case of the spherically shaped particles, the cylindrically shaped particles 51 have smooth wettable outer surfaces 52. In the case of particles 51 being composed of a polymer such as polyethylene or polypropylene and suspended in water, it is necessary to partially oxidize the outer surface 52 in order to render it water-wettable and thereby improve the flow characteristics of the hydraulic fluid 50.

As in the case of the spherically shaped particles, cylindrically shaped particles 51 having a density higher than that of the suspending liquid 55, result in a hydraulic fluid 50 having a density higher than that of the pure suspending liquid 55.

Conversely, hollow and other cylindrically shaped particles having a density lower than that of the suspending liquid result in a hydraulic fluid having a density lower than that of the pure suspending liquid.

Furthermore, the particles may be in the form of hollow micro-tubules having one or both ends open as shown in FIG. 3A. Hollow micro-tubule 41 is composed of a tubule wall 43, having a smooth and wettable outer surface 42, and an interior space 44. Space 44 will typically contain a gas, such as air for example, having a density much lower than that of the suspending liquid. Furthermore, hollow micro-tubule 15 may have either one end or both ends open.

A further specific embodiment of the present invention includes a micro-tubule capable of selectively absorbing a liquid contaminant from another liquid. Such a micro-tubule is shown in FIG. 4 of the drawings. Micro-tubule 80 comprises a tubule wall 81 having hydrophilic outer surface 82 and a hydrophobic inner surface 83. Micro-tubule 80 has two open ends. Tubule wall 81 surrounds an interior space 84. In a dry state, interior space 84 is filled with a gas, typically air. When a multiplicity of these open-end micro-tubules 80 are added to a liquid, such as water for example, containing a hydrocarbon contaminant, such as oil for example, the micro-tubules 80 will float because of the gas entrapped within the interior space 84. The micro-tubules 80 float on the oil-water interface. Thus, meniscus lines 85 and 86 form along the liquid-gas interface. Because the inner surface 83 of the micro-tubule 80 is hydrophobic, and hence, by definition oleophilic, oil is drawn into the interior space 84 and ultimately displaces some, if not all, of the gas initially entrapped within interior space 84. Even though the gas is displaced by the oil, micro-tubules 80 continue to float because the oil is less dense than the surrounding water. Ultimately, a sludge is formed consisting of a multiplicity of micro-tubules containing oil. This sludge immobilizes the oil slick and makes it amenable to separation and collection from the body of water.

In addition to oil spill clean-ups, other examples of municipal water and industrial waste water clean-up may be imagined in which the micro-tubules 80, either alone or in combination with chemical additives, may be employed to selectively remove liquid contaminants.

Besides varying the density of hydraulic fluids, the particles of the present invention may also be used to control and vary the compressibility of hydraulic fluids. In the case of the hollow spherical particle 11, the compressibility of the hydraulic fluid 10 may be varied by controlling either the thickness or the flexibility of particle wall 13. By making particle wall 13 either thinner or more flexible, the compressibility of hydraulic fluid 10 is increased. Conversely, by increasing the thickness or the rigidity of particle wall 13, the compressibility of the hydraulic fluid 10 is decreased.

In the case of the hollow enclosed cylindrically shaped particles (not shown), the compressibility is controlled in much the same way as in the case of the hollow spherical particles 11. However, in the case of the hollow micro-tubules 41 having either one or both ends open, the compressibility of the hydraulic fluid is relatively uneffected by the thickness and flexibility of the tubule all 43. In the case of open ended particles, there is direct contact between the suspending liquid and the gas contained in the interior space 44. Thus, the compressibility of the hydraulic fluid is a function of the compressibility of the gas contained within space 44 rather than the flexibility of the particle wall 43.

In another embodiment of the present invention, a hydraulic fluid is provided having a variable and controllable viscosity. Referring to FIG. 5, variable viscosity hydraulic fluid 60 consists of suspending liquid 65 and a multiplicity of microfilaments 61. Microfilament 61 comprises a microfilament wall 63 surrounding an interior space 64. Thus, hollow microfilament 61 contains a gas, such as air for example, within interior space 64, and hence, may be used to provide a low density hydraulic fluid very similar to the case of the open ended tubules. However, microfilament 61 has a length-to-diameter ratio in the range from about 3 to about 1,000, and a preferred ratio in the range from about 50 to about 150, while the micro-tubule embodiment has a ratio in the range from about 1 to 3. These microfilaments may be either hollow resulting in a low density variable viscosity hydraulic fluid 60, as shown in FIG. 5, or solid resulting in a high density variable viscosity hydraulic fluid 60 as shown in FIG. 5A. In either case, the microfilaments are typically composed of synthetic polymers and are manufactured by any number of known fiber spinning methods.

The viscosity of the resultant hydraulic fluid 60 is a function of both the length-to-diameter ratio of the microfilaments and the concentration of microfilaments in the suspending liquid. As the length-to-diameter ratio increases, so does the viscosity of the hydraulic fluid. Thus, rather than having "short" tubules which flow easily over one another, the "long" microfilaments 61 tend to entangle with one another thereby inhibiting fluid flow and increasing the viscosity of the hydraulic fluid 60.

Although this invention has been described in connection with specific forms thereof, it will be appreciated by those skilled in the art that a wide variety of equivalents may be substituted for the specific elements and steps of operation shown and described herein, that certain features may be used independently of other features, and that parts may be reversed, all without departing from the spirit and scope of this invention as defined in the appended claims.

I claim:
1. A low density liquid suspension comprising:
   a. a suspending liquid; and
   b. a multiplicity of hollow, gas-containing polymer particles having a density substantially lower than the density of said suspending liquid, said particles having smooth outer surfaces wettable by said suspending liquid.

2. The low density liquid suspension as defined in claim 1, wherein said polymer is polyethylene.

3. The low density liquid suspension as defined in claim 1, wherein said polymer is polypropylene.

4. The low density liquid suspension as defined in claim 1, wherein said particles are substantially spherically shaped and have a diameter in the range from about 10 to about 1000 microns.

5. The low density liquid suspension of claim 1, wherein the ratio of suspending liquid volume to particle volume is in the range from about 0.6 to about 2.0.

6. The low density liquid suspension as defined in claim 1, wherein said particles are substantially cylindrically shaped.

7. The low density liquid suspension as defined in claim 1, wherein said particles are substantially elliptically shaped.

8. The low density liquid suspension as defined in claim 6, wherein said particles have at least one open end.

9. The low density liquid suspension as defined in claim 8, wherein the interior surfaces of said particles are hydrophobic.

10. A highly compressible liquid suspension comprising:
   a. a suspending liquid; and
   b. a multiplicity of hollow, enclosed gas-containing polymer particles having flexible particle walls.

11. A highly compressible liquid suspension comprising:
   a. A suspending liquid; and
   b. a multiplicity of hollow non-enclosed gas-containing polymer particles.

12. A high viscosity liquid suspension comprising:
   a. a suspending liquid; and
   b. a multiplicity of polymer microfilaments having a length-to-diameter ratio in the range from about 1.0 to about 1000.

13. A high viscosity liquid suspension as defined in claim 12, wherein said ratio is in the range from about 50 to about 150.

14. The high viscosity liquid suspension as defined in claim 12, wherein said microfilaments are hollow and contain a gas.

15. The high viscosity liquid suspension as defined in claim 12, wherein said polymer microfilaments have smooth outer surfaces wettable by said suspending liquid.

16. In a method of lowering the density of a liquid, the step comprising suspending in said liquid a multiplicity of hollow gas-containing polymer particles having a density substantially different from the density of said suspending liquid, said particles having smooth outer surfaces wettable by said suspending liquid.

17. The method as defined in claim 16, wherein said polymer is taken from the group comprising polyethylene and polypropylene.

18. The method as defined in claim 16, wherein said particles are substantially spherically shaped and have a diameter in the range from about 10 to about 1,000 microns.

19. The method as defined in claim 16, wherein the ratio of suspending liquid volume to particle volume is in the range from about 0.6 to about 2.0.

20. The method as defined in claim 16, wherein said particles are substantially cylindrically shaped.

21. The method as defined in claim 16, wherein said particles are substantially elliptically shaped.

22. The method as defined in claim 16, wherein said particles are non-enclosed.

23. In a method of increasing the compressibility of a liquid, the step comprising adding to said liquid a multiplicity of hollow enclosed gas-containing polymer particles.

24. In a method of varying the compressibility of a liquid, the step comprising adding to said liquid a multiplicity of hollow non-enclosed gas-containing polymer particles.

25. In a method of increasing the viscosity of a liquid the step comprising adding to said liquid a multiplicity of polymer microfilaments having a length-to-diameter ratio in the range from about 1.0 to about 1,000.

26. The method as defined in claim 25, wherein said ratio is in the range from about 50 to about 150.

27. The method as defined in claim 25, wherein said microfilaments are hollow.

28. The method as defined in claim 25, wherein said microfilaments have smooth outer surfaces wettable by said suspending liquid.

* * * * *